United States Patent
Sugimoto

(10) Patent No.: US 11,326,535 B2
(45) Date of Patent: May 10, 2022

(54) MISFIRE DETECTION APPARATUS FOR INTERNAL COMBUSTION ENGINE

(71) Applicant: TOYOTA JIDOSHA KABUSHIKI KAISHA, Toyota (JP)

(72) Inventor: Hitoki Sugimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/304,023

(22) Filed: Jun. 14, 2021

(65) Prior Publication Data
US 2022/0042470 A1 Feb. 10, 2022

(30) Foreign Application Priority Data
Aug. 7, 2020 (JP) .............................. JP2020-135301

(51) Int. Cl.
*F02D 41/14* (2006.01)
*F02D 41/00* (2006.01)
*G01M 15/11* (2006.01)

(52) U.S. Cl.
CPC ....... *F02D 41/1498* (2013.01); *F02D 41/009* (2013.01); *F02D 41/0097* (2013.01); *G01M 15/11* (2013.01); *F02D 2041/1433* (2013.01); *F02D 2200/101* (2013.01); *F02D 2200/1015* (2013.01)

(58) Field of Classification Search
CPC ............... F02D 41/1498; F02D 41/009; F02D 41/0097; F02D 2041/1433; F02D 2200/101; F02D 2200/1015; G01M 15/11
USPC .......................... 701/111; 73/114.02–114.12
See application file for complete search history.

(56) References Cited

U.S. PATENT DOCUMENTS

| | | | | | |
|---|---|---|---|---|---|
| 4,256,073 | A | * | 3/1981 | Kobashi | F02P 5/1504 123/406.65 |
| 5,625,143 | A | * | 4/1997 | Kadota | G01M 15/11 324/392 |
| 5,823,166 | A | * | 10/1998 | Entenmann | F02D 41/009 123/436 |

(Continued)

FOREIGN PATENT DOCUMENTS

| | | | | |
|---|---|---|---|---|
| JP | 2007315207 A | * | 12/2007 | ......... F02D 41/0097 |
| JP | 2008057491 A | * | 3/2008 | ......... F02D 41/0097 |

(Continued)

*Primary Examiner* — Sizo B Vilakazi
*Assistant Examiner* — Brian R Kirby
(74) *Attorney, Agent, or Firm* — Oblon, McClelland, Maier & Neustadt, L.L.P.

(57) ABSTRACT

A CPU substitutes a difference between a crank-side speed that is a rotation speed of a crankshaft and a downstream-side speed that is a speed of a portion, opposite from the crankshaft, in a damper into a differential speed. The CPU calculates a torsion speed component that is a speed component of the crankshaft due to torsion of the damper based on a physical model of which an input is the differential speed, and calculates a time that is a variable indicating a speed of the crankshaft, used to determine a misfire, based on the torsion speed component. The CPU delays acquisition time of the downstream-side speed used to calculate the differential speed, with respect to acquisition time of the crank-side speed according to the rotation speed of the crankshaft.

4 Claims, 4 Drawing Sheets

(56) References Cited

U.S. PATENT DOCUMENTS

| | | | |
|---|---|---|---|
| 2003/0114228 A1* | 6/2003 | Zottmann | F16F 15/13438 464/68.92 |
| 2009/0063024 A1* | 3/2009 | Katayama | G01M 15/11 73/114.02 |
| 2009/0118990 A1* | 5/2009 | Suzuki | B60K 6/448 701/111 |
| 2009/0014521 A1 | 6/2009 | Suzuki | |
| 2009/0145210 A1* | 6/2009 | Suzuki | G01M 15/11 73/114.04 |
| 2009/0308145 A1* | 12/2009 | Suzuki | F02D 41/2451 180/65.28 |
| 2010/0218598 A1* | 9/2010 | Suzuki | G01M 15/11 73/114.04 |
| 2016/0152231 A1* | 6/2016 | Sugimoto | B60W 50/0205 903/905 |
| 2017/0037800 A1* | 2/2017 | Sugimoto | F02D 41/1498 |
| 2017/0138328 A1* | 5/2017 | Takei | F02P 5/1508 |

FOREIGN PATENT DOCUMENTS

| | | | |
|---|---|---|---|
| JP | 2008057492 A | * | 3/2008 |
| JP | 2009-162218 A | | 7/2009 |

* cited by examiner

FIG. 4A EXECUTION TIME

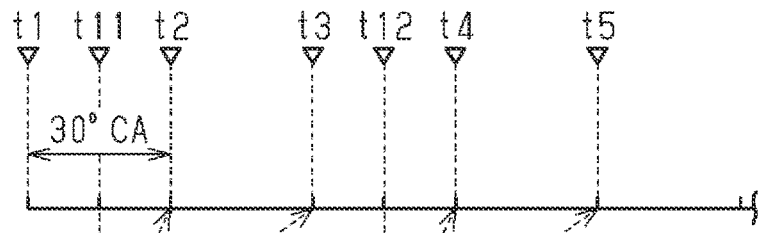

FIG. 4B ωout RECEPTION TIME

FIG. 5

```
ωr CALCULATION PROCESS
```

S60
$\omega e720 \leftarrow (CR/et3xdh[23] + CR/et3xdh[24]$
$+ \cdots + CR/et3xdh[47])/24$ S62
CALCULATE Tdlay

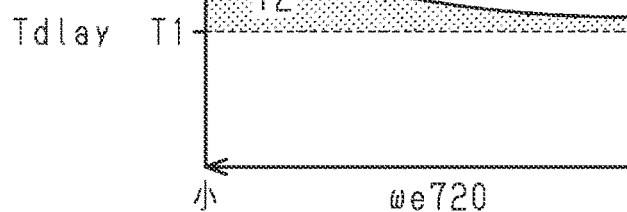

S64
$et3xdsum = et3xdh[23] + et3xdh[22] + \cdots et3xdh[a]$
$et3xdh[23] + et3xdh[22] + \cdots et3xdh[a-1] < Tdlay$
$\leq et3xdh[23] + et3xdh[22] + \cdots et3xdh[a]$ S66
$\beta \leftarrow [Tdlay \cdot (23-a+1)/et3xdsum]$ S68
$\omega outs \leftarrow \omega out[24-a] + (\omega out[24-a-1]$
$- \omega out[24-a]) \cdot (\beta - 23 + a)$

RETURN

MISFIRE DETECTION APPARATUS FOR INTERNAL COMBUSTION ENGINE

CROSS-REFERENCE TO RELATED APPLICATION

This application claims priority to Japanese Patent Application No. 2020-135301 filed on Aug. 7, 2020, incorporated herein by reference in its entirety.

BACKGROUND

1. Technical Field

The disclosure relates to a misfire detection apparatus for an internal combustion engine.

2. Description of Related Art

For example, Japanese Unexamined Patent Application Publication No. 2009-162218 (JP 2009-162218 A) describes a misfire detection apparatus for an internal combustion engine. The misfire detection apparatus is applied to a drive-train in which a crankshaft of the internal combustion engine is mechanically coupled to a drive wheel side via a damper. The apparatus calculates a torsion speed component due to resonance in the rotation speed of the crankshaft, based on a physical model. An input of the physical model is a difference between the rotation speed of the crankshaft and a downstream-side speed that is the drive wheel-side rotation speed of the damper. The apparatus determines whether there is a misfire based on a value obtained by removing the torsion speed component from the rotation speed of the crankshaft.

SUMMARY

Incidentally, the apparatus calculates an instantaneous rotation speed of the crankshaft each time the crankshaft rotates 30° C.A and uses the instantaneous rotation speed for determining a misfire. For this reason, it is convenient to repeatedly execute a process related to detection of a misfire at intervals of 30° C.A. However, in this case, when the downstream-side speed is provided at time intervals, a phase shift from the instantaneous rotation speed of the crankshaft becomes a factor that decreases misfire detection accuracy.

An aspect of the disclosure relates to a misfire detection apparatus for an internal combustion engine.

1. A misfire detection apparatus is applied to an internal combustion engine of which a crankshaft is connected to a power transmission destination via a damper. The misfire detection apparatus includes an electronic control unit. The electronic control unit is configured to execute a crank-side acquisition process of acquiring a crank-side speed that is a rotation speed of the crankshaft in a small rotation angle range at every predetermined rotation angle of the crankshaft; a downstream-side acquisition process of acquiring a downstream-side speed that is a rotation speed of a portion of the damper, opposite from the crankshaft, in a small rotation angle range at predetermined time intervals; a calculation process of calculating a torsion speed component based on a physical model of which an input is a difference between the crank-side speed and the downstream-side speed, the torsion speed component being a component due to torsion of the damper in the crank-side speed; a determination process of determining whether there is a misfire in the internal combustion engine based on a determination speed variable that is a variable indicating a rotation speed of the crankshaft, from which the torsion speed component has been removed; and a phase compensation process of compensating a phase difference between the downstream-side speed and the crank-side speed that are used to calculate the difference that is the input of the physical model and varying a phase compensation amount for compensating the phase difference according to the rotation speed of the crankshaft.

With the above configuration, while the crank-side speed is acquired at every predetermined rotation angle, the downstream-side speed is acquired at every predetermined time. Therefore, in calculating a torsion speed component based on a difference between the crank-side speed and the downstream-side speed, there is a concern that a phase shift between the crank-side speed and the downstream-side speed becomes a factor that decreases the calculation accuracy of a torsion speed component. The average value of the magnitude of the phase shift is less when the rotation speed of the crankshaft is high than when the rotation speed of the crankshaft is low. For this reason, with the above configuration, a torsion speed component is calculated while a phase difference between the crank-side speed and the downstream-side speed that are used to calculate the difference is compensated by using a phase compensation amount variably set according to the rotation speed. Thus, a decrease in the calculation accuracy of a torsion speed component is suppressed, and, by extension, a decrease in misfire detection accuracy is suppressed.

2. In the misfire detection apparatus, the phase compensation process may be a process of, based on the phase compensation amount, correcting the downstream-side speed that is used to calculate the difference.

With the above configuration, a determination speed variable is easily generated based on a torsion speed variable by correcting the downstream-side speed, which is used to calculate the difference, by using a phase compensation amount. In contrast, when the crank-side speed that is used to calculate the difference is corrected by using a phase compensation amount, a phase compensation amount needs to be considered in removing a torsion speed component from the crank-side speed, so a process of generating a determination speed variable is complicated.

3. In the misfire detection apparatus, the downstream-side acquisition process may be a process of acquiring the downstream-side speed by communication from an external device outside the misfire detection apparatus; the phase compensation amount may include an amount of delay in acquisition time of the downstream-side speed that is used to calculate the difference from acquisition time of the crank-side speed that is used to calculate the difference; and the phase compensation process may include a process of reducing the phase compensation amount when the rotation speed of the crankshaft is high than when the rotation speed of the crankshaft is low.

With the above configuration, the downstream-side speed is acquired by communication, so the acquisition time of the downstream-side speed is delayed with respect to the time when the downstream-side speed is detected. For this reason, with the above configuration, a phase shift caused by a delay due to communication concerned with the difference between the crank-side speed and the downstream-side speed is suppressed by incorporating the amount of delay due to the communication into the phase compensation amount.

4. In the misfire detection apparatus, the phase compensation process may include a phase compensation amount calculation process of calculating the phase compensation amount such that a value of the phase compensation amount is smaller when the rotation speed of the crankshaft is high than when the rotation speed of the crankshaft is low; and an interpolation process of calculating the downstream-side speed that is used to calculate the difference by interpolation using the downstream-side speeds each acquired at time latest to a corresponding one of a pair of acquisition times in the crank-side acquisition process, the pair of acquisition times coming before and after time delayed by the phase compensation amount with respect to the acquisition time of the crank-side speed that is used to calculate the difference.

With the above configuration, when the interpolation process is executed, a phase difference is reduced and, by extension, the calculation accuracy of the difference is further increased in comparison with a case where the downstream-side speed acquired at time latest to time delayed by the phase compensation amount with respect to the acquisition time of the crank-side speed is employed as a speed that is used to calculate the difference.

5. In the misfire detection apparatus, an acquisition time interval of the crank-side speed in the crank-side acquisition process may be shorter than an acquisition time interval of the downstream-side speed in the downstream-side acquisition process.

With the above configuration, since the acquisition time interval in the crank-side acquisition process is shorter than the acquisition time interval of the downstream-side acquisition process, the average value of the time interval between a pair of acquisition times significantly varies according to the rotation speed of the crankshaft. For this reason, the utility value of the process in which the phase compensation amount is variable according to the rotation speed of the crankshaft is particularly high.

6. In the misfire detection apparatus, the determination process based on the torsion speed component may be executed on condition that the rotation speed of the crankshaft is lower than or equal to a predetermined speed.

When the phase compensation amount is determined according to the rotation speed of the crankshaft, the phase compensation amount does not completely eliminate a phase difference as occasion arises, and has a role in increasing the average accuracy of the difference to be repeatedly calculated. For this reason, with the above configuration, the determination process based on a torsion speed component is executed on condition that the rotation speed of the crankshaft is lower than or equal to the predetermined speed. Therefore, the determination process based on a torsion speed component is executed on condition that the accuracy of a torsion speed component is high.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4A is a timing chart showing the acquisition time of a crank-side speed according to the embodiment and FIG. 4B is a timing chart showing the reception time of a downstream-side speed; and FIG. 5 is a flowchart showing the detailed procedure of part of a process to be executed by the control apparatus according to the embodiment.

DETAILED DESCRIPTION OF EMBODIMENTS

Figure 1:
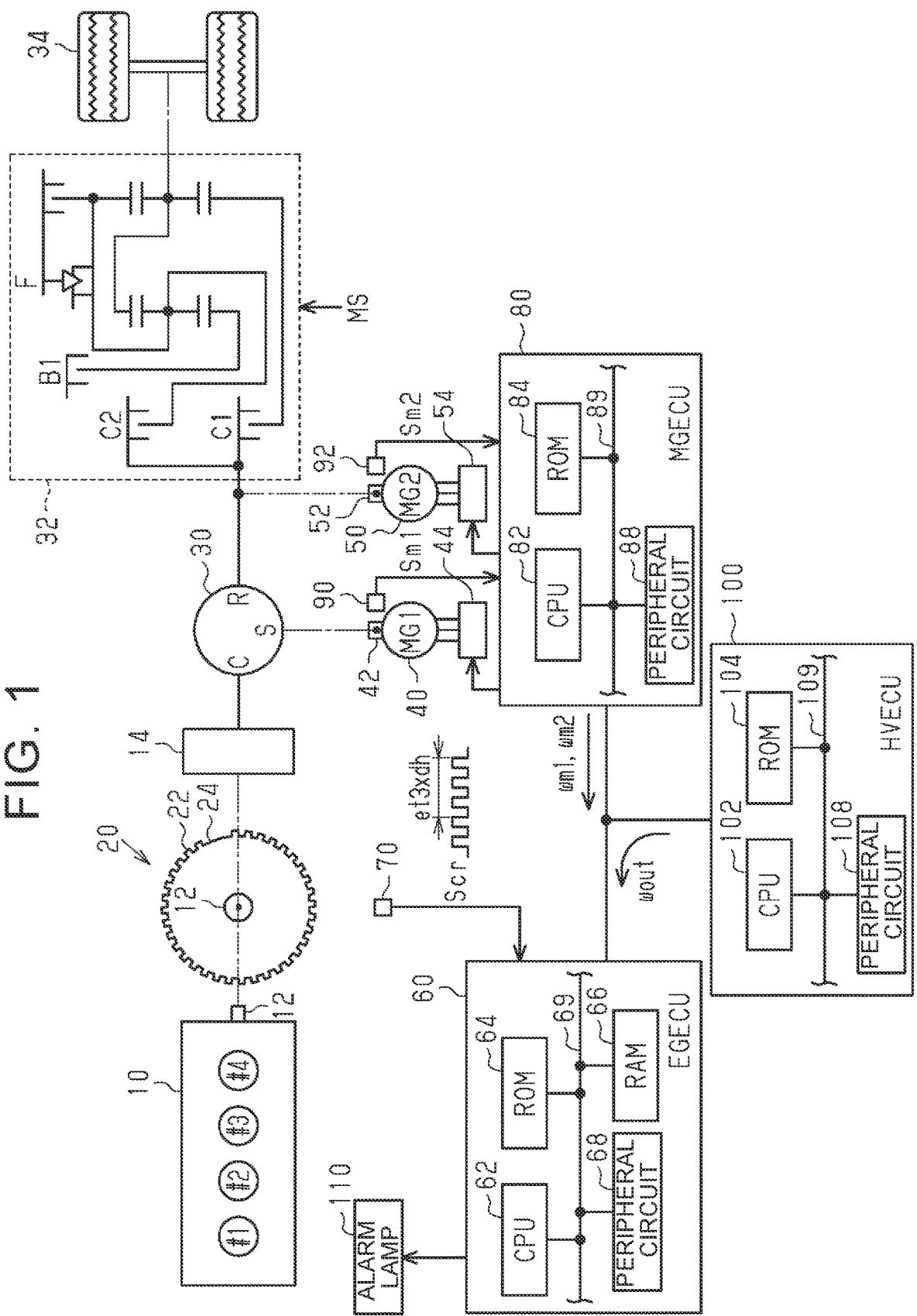
FIG. 1 is a diagram showing the configuration of a control apparatus and a drive-train according to an embodiment.

Hereinafter, an embodiment will be described with reference to the accompanying drawings. As shown in FIG. 1, an internal combustion engine 10 is a four-stroke engine having four cylinders #1, #2, #3, #4. A crank rotor 20 having tooth portions 22 is coupled to a crankshaft 12 of the internal combustion engine 10. The tooth portions 22 respectively indicate multiple rotation angles of the crankshaft 12. The crank rotor 20 basically has the tooth portions 22 at an interval of 10° C.A; however, the crank rotor 20 has a toothless portion 24 that is a portion at which the interval between the adjacent tooth portions 22 is 30° C.A. This is to indicate a reference rotation angle of the crankshaft 12.

A power split device 30 is mechanically coupled to the crankshaft 12 via a damper 14. The power split device 30 splits the power of each of the internal combustion engine 10, a first motor generator 40, and a second motor generator 50. The power split device 30 includes a planetary gear train having a carrier C, a sun gear S, and a ring gear R. The crankshaft 12 is mechanically coupled to the carrier C via the damper 14. A rotary shaft 42 of the first motor generator 40 is mechanically coupled to the sun gear S. A rotary shaft 52 of the second motor generator 50 is mechanically coupled to the ring gear R. An output voltage of a first inverter 44 is applied to the terminals of the first motor generator 40. An output voltage of a second inverter 54 is applied to the terminals of the second motor generator 50.

In addition to the rotary shaft 52 of the second motor generator 50, drive wheels 34 are mechanically coupled to the ring gear R of the power split device 30 via a transmission 32. A control apparatus 60 controls the internal combustion engine 10 as a controlled object and operates various operating units of the internal combustion engine 10 to control torque, exhaust component ratio, and the like that are controlled variables of the internal combustion engine 10. When the control apparatus 60 controls the controlled variables, the control apparatus 60 refers to an output signal Scr of a crank angle sensor 70, an output signal of an MGECU 80, and an output signal of an HVECU 100.

The control apparatus 60 includes a CPU 62, a ROM 64, a RAM 66, and a peripheral circuit 68 that are able to communicate with one another via a local network 69. The peripheral circuit 68 includes a circuit that generates a clock signal for regulating internal operations, a power supply circuit, a reset circuit, and the like. The control apparatus 60 controls the controlled variables by the CPU 62 running a program stored in the ROM 64.

The MGECU 80 controls the first motor generator 40 as a controlled object and operates the first inverter 44 to control torque, rotation speed, and the like that are controlled variables of the first motor generator 40. The MGECU 80 controls the second motor generator 50 as a controlled object and operates the second inverter 54 to control torque, rotation speed, and the like that are controlled variables of the second motor generator 50. To control the controlled variables, the MGECU 80 refers to an output signal Sm1 of a first rotation angle sensor 90 and an output signal Sm2 of a second rotation angle sensor 92. The first rotation angle sensor 90 detects the rotation angle of the rotary shaft 42 of the first motor generator 40. The second rotation angle sensor 92 detects the rotation angle of the rotary shaft 52 of the second motor generator 50. The MGECU 80 includes a CPU 82, a ROM 84, and a peripheral circuit 88 that are able to communicate with one another via a local network 89.

The HVECU 100 controls a hybrid system including the internal combustion engine 10, the first motor generator 40, and the second motor generator 50. The HVECU 100 outputs a torque command value for the internal combustion engine 10 to the control apparatus 60 and outputs output command values respectively for the first motor generator 40 and the second motor generator 50 to the MGECU 80. The HVECU 100 includes a CPU 102, a ROM 104, and a peripheral circuit 108 that are able to communicate with one another via a local network 109.

Figure 2:
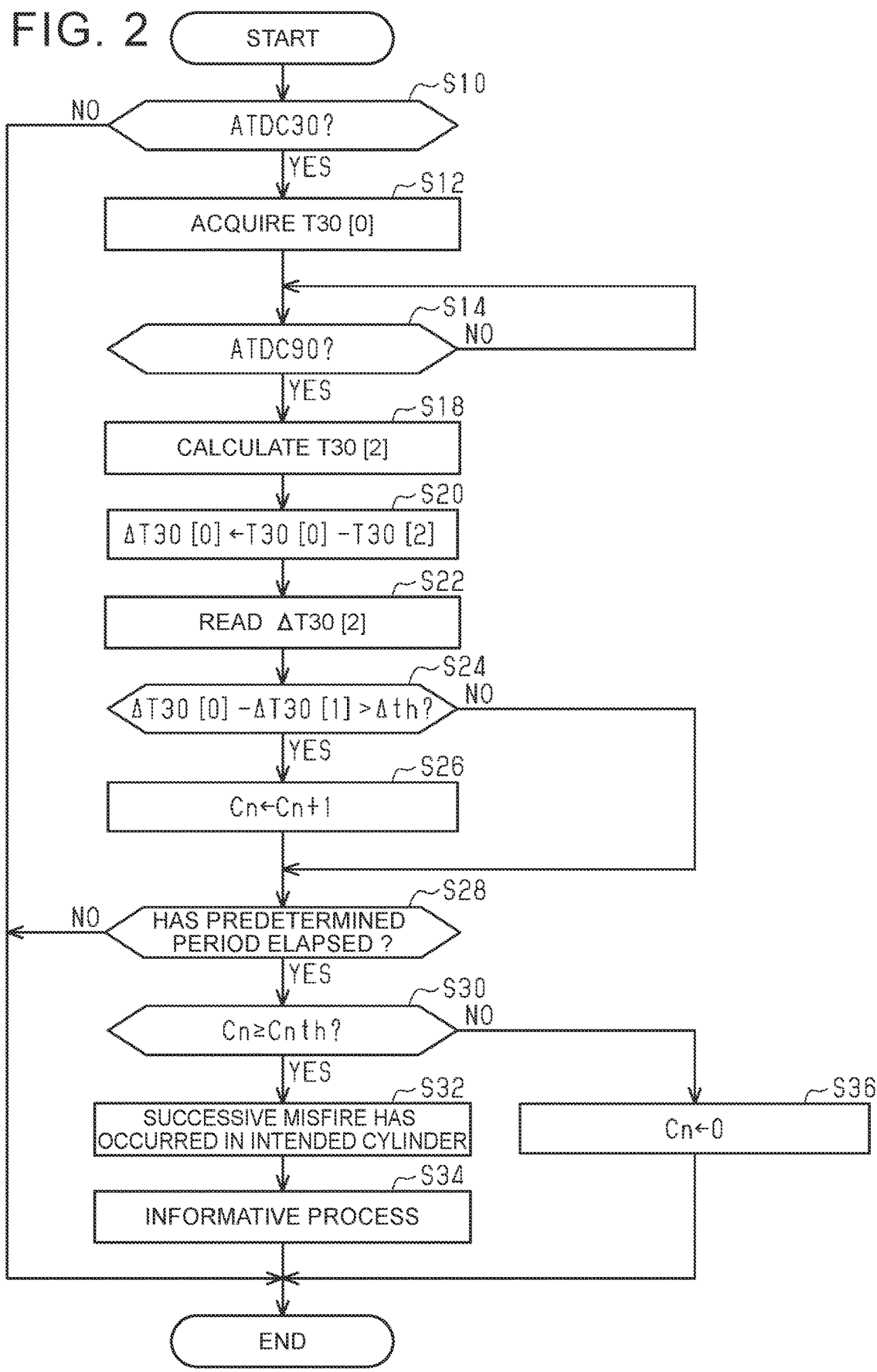
FIG. 2 is a flowchart showing the procedure of a process to be executed by the control apparatus according to the embodiment.

FIG. 2 shows the procedure of a process to be executed by the control apparatus 60. The process shown in FIG. 2 is implemented by the CPU 62 repeatedly running the program stored in the ROM 64 at intervals of a predetermined crank angle. Hereinafter, numerals prefixed with "S" represent step numbers of processes.

In a series of processes shown in FIG. 2, the CPU 62 initially determines whether the current rotation angle of the crankshaft 12 is ATDC30° C.A with reference to the compression top dead center of one of the cylinders #1, #2, #3, #4, for detection of a misfire (S10). When the CPU 62 determines that the current rotation angle is ATDC30° C.A (YES in S10), the CPU 62 acquires a time T30[0] required for the crankshaft 12 to rotate 30° C.A from the compression top dead center (S12). Subsequently, the CPU 62 waits until the current rotation angle becomes ATDC90° C.A (NO in S14). When the CPU 62 determines that the current rotation angle is ATDC90° C.A (YES in S14), the CPU 62 acquires a time T30[2] required for the crankshaft 12 to rotate from ATDC60° C.A to ATDC90° C.A (S18). A numeral in parentheses suffixed to T30 is a variable that increases by one each time the rotation angle advances 30° C.A. The CPU 62 substitutes a value obtained by subtracting the time T30[2] from the time T30[0] into a rotation variation $\Delta$T30[0] related to the cylinder in which the compression top dead center is detected in the process of S10 (S20). The rotation variation $\Delta$T30 is negative when no misfire is occurring in the cylinder for detection of a misfire and is positive when a misfire is occurring. The CPU 62 causes the RAM 66 to store the rotation variation $\Delta$T30[0].

Subsequently, the CPU 62 reads a rotation variation $\Delta$T30[2] 360° C.A before (S22). The rotation variation $\Delta$T30[2] is a value stored in the RAM 66 in the process of S20 360° C.A before. The CPU 62 determines whether a value obtained by subtracting the rotation variation $\Delta$T30[2] from the rotation variation $\Delta$T30[0] is greater than a threshold $\Delta$th (S24). When no misfire is occurring in the cylinder for detection of a misfire, the rotation variation $\Delta$T30[0] and the rotation variation $\Delta$T30[2] are comparable amounts, and the subtracted value is a value near zero. In contrast, when a misfire is occurring in the cylinder for detected of a misfire, the subtracted value is a large positive value. The threshold $\Delta$th is set to a value that the subtracted value can take when a misfire occurs.

When the CPU 62 determines that the subtracted value is greater than the threshold $\Delta$th (YES in S24), the CPU 62 increments a counter Cn (S26). When the CPU 62 completes the process of S26 or makes a negative determination in the process of S24, the CPU 62 determines whether a predetermined period has elapsed from a later one of the timing at which the process of S24 is executed for the first time and the execution timing of the process of S36 (described later) (S28). When the CPU 62 determines that the predetermined period has elapsed (YES in S28), the CPU 62 determines that the counter Cn is greater than or equal to a threshold Cnth (S30). The threshold Cnth is set according to the number of times a misfire occurs in the cylinder within a predetermined period when a misfire successively occurs in the intended cylinder. When the CPU 62 determines that the counter Cn is greater than or equal to the threshold Cnth (YES in S30), the CPU 62 determines that a misfire has successively occurred in the cylinder for detection of a misfire (S32). The CPU 62 executes an informative process of informing a user of that fact by operating an alarm lamp 110 shown in FIG. 1 (S34).

On the other hand, when the CPU 62 determines that the counter Cn is less than the threshold Cnth (NO in S30), the CPU 62 initializes the counter Cn (S36). When the CPU 62 completes the process of S34 or S36 or makes a negative determination in the process of S10 or S28, the CPU 62 once ends the series of processing shown in FIG. 2.

Figure 3:
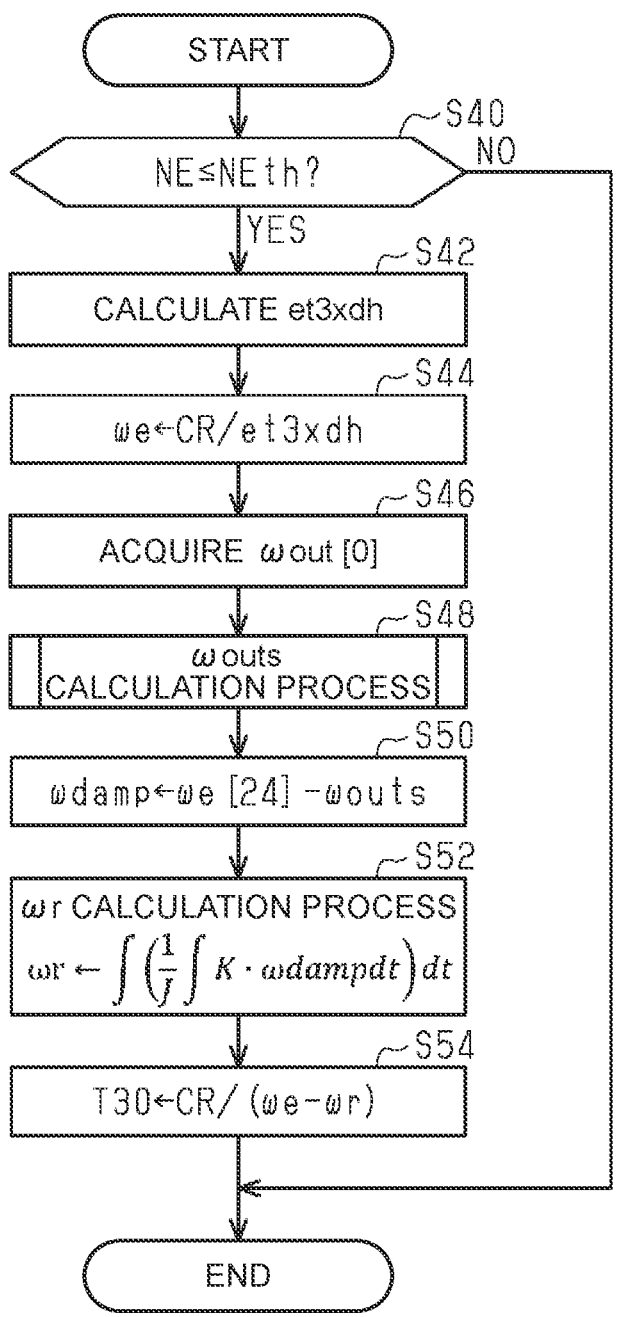
FIG. 3 is a flowchart showing the procedure of a process to be executed by the control apparatus according to the embodiment.

FIG. 3 shows the procedure of a process of calculating a time T30 required for the crankshaft 12 to rotate 30° C.A. The process shown in FIG. 3 is implemented by the CPU 62 running a program stored in the ROM 64 at intervals at which the crankshaft 12 rotates 30° C.A. Specifically, the process is repeatedly executed on condition that, for example, the crank angle sensor 70 detects a predetermined tooth portion 22. The predetermined tooth portion 22 is defined at every 30° C.A.

In a series of processes shown in FIG. 3, the CPU 62 initially determines whether a rotation speed NE of the crankshaft 12 is lower than or equal to a predetermined speed NEth (S40). This process is a process of determining whether to execute a misfire determination process by using a time T30 based on the processes of S42 to S54 (described later). The predetermined speed NEth is set according to an upper limit up to which the calculation accuracy of the process of S48 (described later) falls within an allowable range. The rotation speed NE is calculated by the CPU 62 based on the output signal Scr of the crank angle sensor 70. The rotation speed NE indicates an average speed in a period during which the crankshaft 12 rotates two or more revolutions of the crankshaft 12.

When the CPU 62 determines that the rotation speed NE is lower than or equal to the predetermined speed NEth (YES in S40), the CPU 62 calculates a time et3xdh required for the crankshaft 12 to rotate the last 30° C.A rotation angle range (S42). As shown in FIG. 1, this process is a process of counting a time required from when the crank angle sensor 70 detects any one of two tooth portions 22 spaced 30° C.A apart from each other to when the crank angle sensor 70 detects the other one. Subsequently, the CPU 62 calculates a crank-side speed we that is the rotation speed of the crankshaft 12 in the last 30° C.A rotation angle range by dividing an angle constant CR corresponding to 30° C.A by the time et3xdh (S44).

Subsequently, the CPU 62 acquires a downstream-side speed $\omega$out[0] that is a carrier C-side rotation speed in the damper 14 (S46). This process is a process of selecting the latest one among the downstream-side speeds $\omega$out output at predetermined time intervals from the HVECU 100.

FIG. 4A illustrates the execution time of the process of FIG. 3. FIG. 4B illustrates the reception time of the downstream-side speed $\omega$out by the control apparatus 60. As shown in FIG. 4A and FIG. 4B, the process of FIG. 3 is executed at time t1, time t2, time t3, time t4, time t5, . . . at intervals of 30° C.A. On the other hand, the HVECU 100 calculates and outputs the downstream-side speed ωout at intervals of a predetermined time Tr, so the control apparatus 60 receives the downstream-side speed ωout at time t11, time t12, . . . at intervals of the predetermined time Tr. In the present embodiment, the reception interval of the downstream-side speed ωout is longer than the time interval of the execution time of the process of FIG. 3. FIG. 4A and FIG. 4B show an example in which, both when the process of S46 is executed at time t2 and when the process of S46 is executed at time t3, the downstream-side speed ωout received at time t11 is acquired.

The CPU 102 of the HVECU 100 calculates the downstream-side speed ωout based on a rotation speed ωm1 of the rotary shaft 42 of the first motor generator 40 in a small rotation angle range, a rotation speed ωm2 of the rotary shaft 52 of the second motor generator 50 in the small rotation angle range, and the gear ratio of the power split device 30. The small rotation angle range is defined as a rotation angle range smaller than one rotation. The rotation speed ωm1 is calculated by the CPU 82 of the MGECU 80 based on an output signal Sm1 of the first rotation angle sensor 90. The rotation speed ωm2 is calculated by the CPU 82 of the MGECU 80 based on an output signal Sm2 of the second rotation angle sensor 92.

Referring back to FIG. 3, the CPU 62 calculates a downstream-side speed ωouts that is a carrier C-side rotation speed in the damper 14 synchronized with a crank-side speed ωe[24] one combustion cycle before (S48). Subsequently, the CPU 62 substitutes a value obtained by subtracting the downstream-side speed ωouts from the crank-side speed ωe[24] into a differential speed ωdamp (S50).

Subsequently, the CPU 62 calculates a torsion speed component ωr that is a speed component due to torsion of the damper 14 in the crank-side speed ωe based on a physical model of which an input is the differential speed ωdamp (S52). This model includes a process of calculating a torsion angle θdamp between the crankshaft 12-side portion and carrier C-side portion of the damper 14 based on a process of integrating the differential speed ωdamp. In addition, this model includes a process of calculating a torsion speed component ωr based on a process of integrating a value obtained by dividing a torsion torque, which is obtained by multiplying the torsion angle θdamp by the elastic modulus K, by the coefficient of inertia J. The CPU 62 substitutes a value obtained by dividing the angle constant CR by a value obtained by subtracting the torsion speed component ωr from the crank-side speed ωe into the time T30 (S54).

When the CPU 62 completes the process of S54 or makes a negative determination in the process of S40, the CPU 62 once ends the series of processes shown in FIG. 3.

FIG. 5 shows the details of the process of S48.

In a series of processes shown in FIG. 5, the CPU 62 initially calculates an average speed ωe720 that is an average speed of the crankshaft 12 during four strokes from two combustion cycles before to one combustion cycle before (S60). More specifically, the CPU 62 substitutes a simple moving average of values respectively obtained by dividing the angle constant CR by et3xdh[23], et3xdh[24], et3xdh[25], et3xdh[26], et3xdh[27], et3xdh[28], et3xdh[29], et3xdh[30], et3xdh[31], et3xdh[32], et3xdh[33], et3xdh[34], et3xdh[35], et3xdh[36], et3xdh[37], et3xdh[38], et3xdh[39], et3xdh[40], et3xdh[41], et3xdh[42], et3xdh[43], et3xdh[44], et3xdh[45], et3xdh[46], et3xdh[47] before the last et3xdh[0] acquired in the process of S42, into an average speed ωe720.

A numeral in parentheses suffixed to et3xdh is a variable that indicates sampling timing at every 30° C.A.

Subsequently, the CPU 62 calculates a delay time Tdlay of the time when the downstream-side speed ωout is acquired in the process of S46 from the time when the downstream-side speed ωout is actually detected, based on the average speed ωe720 (S62). The delay time Tdlay is the sum of a communication delay time T1 and a time T2 taken from when the control apparatus 60 receives the downstream-side speed ωout to when the control apparatus 60 acquires the downstream-side speed ωout in the process of S46. The communication delay time T1 is the sum of a time required for communication at the time when the MGECU 80 transmits the rotation speeds ωm1, ωm2 to the HVECU 100 and a time required for the HVECU 100 to calculate the downstream-side speed ωout from the rotation speeds ωm1, ωm2 and transmit the downstream-side speed ωout to the control apparatus 60. On the other hand, because a time interval between each reception time and the execution time of the process of S46 fluctuates, the time T2 is actually not a constant value even when the average speed ωe720 is the same. However, in the present embodiment, an average value of the time T2 according to the average speed ωe720 is employed. The average value is shorter when the average speed ωe720 is high than when the average speed ωe720 is low. Therefore, the CPU 62 calculates a delay time Tdlay such that the delay time Tdlay is shorter when the average speed ωe720 is high than when the average speed ωe720 is low.

More specifically, in a state where map data that uses the average speed ωe720 as an input variable and uses the delay time Tdlay as an output variable is prestored in the ROM 64, the CPU 62 obtains the delay time Tdlay through map computation. Map data is dataset of discrete values of an input variable and values of an output variable respectively associated with the values of the input variable. In map computation, for example, when the value of an input variable coincides with any one of the values of the input variable of the map data, the associated value of the output variable of the map data may be used as a computed result; whereas, when the value of an input variable does not coincide with any of the values of the input variable, a value obtained through interpolation using a plurality of the values of the output variable included in the map data may be used as a computed result.

Subsequently, the CPU 62 adds the times et3xdh[23], et3xdh[22], . . . to a total time et3xdsum, beginning with the time et3xdh[23], until the accumulated time exceeds the delay time Tdlay (S64). The CPU 62 defines a variable that designates the time et3xdh added last in this calculation as a variable α.

Subsequently, the CPU 62 substitutes a value obtained by dividing a value, obtained by multiplying the delay time Tdlay by (23−α+1), by the total time et3xdsum into a variable β (S66). This process is a process of calculating how many times the delay time Tdlay is equivalent to the time et3xdh with decimal places. In other words, a value obtained by dividing et3xdsum by (23−α+1) is the average value of (23−α+1) et3xdh's. For this reason, a value obtained by dividing the delay time Tdlay by the average value indicates how many times the delay time Tdlay is equivalent to the average value.

The CPU 62 calculates a downstream-side speed ωouts through interpolation using a downstream-side speed ωout [24−α] and a downstream-side speed ωout[24−α−1] (S68). Here, linear interpolation is illustrated as interpolation. Particularly, in the present embodiment, the weight of the downstream-side speed ωout[24−α−1] is set to (β−23+α) and the weight of the downstream-side speed ωout[24−α] is set to (24−β+α). In other words, the degree of contribution of the downstream-side speed ωout[24−α−1] to the downstream-side speed ωouts is increased in proportion to the magnitude of the fractional portion of the variable β.

Here, the operation and advantageous effects of the present embodiment will be described.

The CPU 62 executes a process of detecting a misfire by using a time T30 that is a value obtained by dividing an angle constant CR by a value obtained by subtracting a torsion speed component ωr from a crank-side speed we instead of directly using a time et3xdh that is a difference between the detection times of the tooth portions 22 spaced 30° C.A apart from each other. The CPU 62 calculates a torsion speed component ωr based on a differential speed ωdamp that is a difference between the crank-side speed we and the downstream-side speed ωout received from the HVECU 100. At this time, the CPU 62 delays the acquisition time of the downstream-side speed ωout used to calculate the differential speed ωdamp with respect to the acquisition time of the crank-side speed we used to calculate the differential speed ωdamp. Particularly, the CPU 62 increases the amount of delay when the rotation speed of the crankshaft 12 is low than when the rotation speed of the crankshaft 12 is high. This is based on the fact that the average value of the amount of delay from the time when the CPU 62 receives the downstream-side speed ωout to when the received downstream-side speed ωout is associated with the crank-side speed we acquired in the process of S44 through the process of S46 increases when the rotation speed of the crankshaft 12 is low than when the rotation speed of the crankshaft 12 is high. Thus, in comparison with the case where the process of delaying the acquisition time of the downstream-side speed ωout used to calculate the differential speed ωdamp is not executed, the average value of a phase difference between the crank-side speed we and the downstream-side speed ωouts that are used to calculate the differential speed ωdamp is reduced, and, by extension, a torsion speed component ωr is further highly accurately calculated.

According to the above-described embodiment, operation and advantageous effects described below are further obtained.

(1) The downstream-side speed ωouts is compensated in phase based on the delay time Tdlay. Thus, the process of calculating a time T30 in the process of S54 becomes a simple process. In contrast, when the crank-side speed ωe is compensated in phase, the influence of a phase compensation amount needs to be considered in the process of calculating a time T30 in the process of S54, so the process of calculating a time T30 is complicated.

(2) The delay time Tdlay that is a phase compensation amount of the downstream-side speed ωout with respect to the crank-side speed we used to calculate the differential speed ωdamp includes a delay due to communication between the MGECU 80 and the HVECU 100 and a delay due to communication between the HVECU 100 and the control apparatus 60. Therefore, a phase difference due to communication between the crank-side speed we and the downstream-side speed ωouts that are used to calculate the differential speed ωdamp is reduced.

(3) The downstream-side speed ωouts used to calculate the differential speed ωdamp is calculated through interpolation using downstream-side speeds ωout each acquired at a corresponding one of a pair of execution times of S46. The pair of execution times comes before and after the time when the delay time Tdlay has elapsed from the crank-side speed ωe[24] used to calculate the differential speed ωdamp. Thus, in comparison with the case where the downstream-side speed ωout obtained through the process of S46 executed at the time latest to the time when the delay time Tdlay has elapsed from the crank-side speed ωe[24] is set for the downstream-side speed ωout used to calculate the differential speed ωdamp, a phase difference between the crank-side speed we and the downstream-side speed ωout that are used to calculate the differential speed ωdamp is reduced.

(4) The acquisition time interval of the crank-side speed ωe in the process of S44 is made shorter than the time interval at which the control apparatus 60 receives the downstream-side speed ωout. In this case, in comparison with the case where the acquisition time interval of the crank-side speed ωe in the process of S44 is longer than the time interval at which the control apparatus 60 receives the downstream-side speed ωout, the average value of the delay time of the execution time of the process of S46 with respect to the reception time of the downstream-side speed ωout significantly varies according to the rotation speed of the crankshaft 12. For this reason, the utility value of the process in which the delay time Tdlay is variable according to the rotation speed of the crankshaft 12 is particularly high.

(5) The determination process as to whether there is a misfire based on the torsion speed component ωr is executed on condition that the rotation speed NE of the crankshaft 12 is lower than or equal to the predetermined speed NEth. Thus, the determination process as to whether there is a misfire based on the torsion speed component ωr can be executed on condition that the effect of phase compensation using the delay time Tdlay falls within an allowable range.

Correspondence Relationship

Matters in the above-described embodiment may be regarded as the matters described in SUMMARY as follows. Hereinafter, the correspondence relationship will be described for each of the numbers of the articles described in SUMMARY. [1] to [3] The misfire detection apparatus may be regarded as the control apparatus 60. The crank-side acquisition process may be regarded as the processes of S42 and S44. The downstream-side acquisition process may be regarded as FIG. 4B. The calculation process may be regarded as the process of S52. The determination process may be regarded as the processes of S10, S12, S14, S18, S20, S22, S24, S26, S28, S30, and S32. The phase compensation process may be regarded as the process of S48. [4] The phase compensation amount calculation process may be regarded as the process of S62. The interpolation process may be regarded as the process of S68. [5] This configuration may be regarded as FIG. 4A and FIG. 4B. [6] This configuration may be regarded as the process of S40.

Other Embodiments

The present embodiment may be modified as follows. The present embodiment and the following modifications may be implemented in combination without any technical contradiction.

Differential Speed ωDamp

In the above-described embodiment, the crank-side speed we used to calculate the differential speed ωdamp is set to a value 720° C.A before; however, the configuration is not limited thereto. The crank-side speed we used to calculate the differential speed ωdamp is desirably set to a value at the time a predetermined angle before. The predetermined angle is greater than or equal to the maximum value of a rotation angle that the crankshaft 12 rotates during the time interval of the maximum value of the delay time Tdlay.

The time to determine the differential speed ωdamp is not limited to the time to calculate the crank-side speed ωe. For example, the time to determine the differential speed ωdamp may be median time between a pair of adjacent times to calculate the crank-side speed ωe. In this case, the crank-side speed ωe used in calculating the differential speed ωdamp may be a simple moving average value of crank-side speeds ωe respectively at the pair of times.

Interpolation Process

The interpolation process is not limited to linear interpolation. The interpolation process may be, for example, nonlinear polynomial interpolation.

Crank-Side Acquisition Process and Downstream-Side Acquisition Process

In the above-described embodiment, the configuration in which the acquisition time interval of the downstream-side speed ωout is longer than the acquisition time interval of the crank-side speed ωe is illustrated; however, the configuration is not limited thereto. For example, the acquisition time interval of the downstream-side speed ωout may be made equal to the acquisition time interval of the crank-side speed ωe.

Misfire Detection Process Based on Torsion Speed Component

In the above-described embodiment, the rotation speed NE used to determine whether to execute a misfire detection process based on a torsion speed component ωr is set to an average speed in the period during which the crankshaft 12 rotates two or more revolutions; however, the configuration is not limited thereto.

It is not indispensable to execute the misfire detection process based on a torsion speed component ωr on condition that the rotation speed NE is lower than or equal to the predetermined speed NEth.

Physical Model

In the above-described embodiment, a model using the elastic modulus K and the coefficient of inertia J as fixed values is illustrated as a physical model for calculating a torsion speed component ωr; however, the configuration is not limited thereto. The elastic modulus K may be variable according to a torsion angle θdamp by, for example, setting the elastic modulus K to a larger value when the absolute value of a torsion angle θdamp is large than when the absolute value of a torsion angle θdamp is small.

A physical model for calculating a torsion speed component ωr is not limited to a model including only the elastic modulus K and the coefficient of inertia J. The physical model may be, for example, a model that uses the sum of a term consisting of the product of the coefficient of viscosity and a differential speed ωdamp and a term consisting of the product of a torsion angle θdamp and an elastic modulus K as a torsion torque Tdamp and that uses a time integral value of a value obtained by dividing the torsion torque Tdamp by the coefficient of inertia J as a torsion speed component ωr.

Communication

In the above-described embodiment, the configuration in which the MGECU 80 transmits rotation speeds ωm1, ωm2 to the HVECU 100 and the HVECU 100 transmits a downstream-side speed ωout to the control apparatus 60 is illustrated; however, the configuration is not limited thereto. For example, the MGECU 80 may calculate a downstream-side speed ωout, and the MGECU 80 may transmit the downstream-side speed ωout.

The misfire detection apparatus may be made up of the HVECU 100, and the control apparatus 60 may be configured to transmit a crank-side speed ωe to the HVECU 100, and the MGECU 80 may be configured to transmit a downstream-side speed ωout to the HVECU 100. In this case as well, as long as the crank-side speed ωe is calculated at every predetermined crank angle and the downstream-side speed ωout is calculated at every predetermined time, it is effective to execute a process of compensating a phase difference.

Determination Speed Variable

In the above-described embodiment, a time T30 required to rotate in a small rotation angle range is illustrated as a determination speed variable; however, the configuration is not limited thereto. For example, a rotation speed in a small rotation angle range may be used.

Determination Process

In the above-described embodiment, it is determined whether there is a misfire based on a difference between times required for the crankshaft 12 to rotate 30° C.A. For example, it may be determined whether there is a misfire based on the ratio of times required for the crankshaft 12 to rotate 30° C.A. Also, for example, as described in the article "Determination Speed Variable", when the determination speed variable is set to a variable having a dimension of speed, it may be determined whether there is a misfire based on a difference between angular velocities when the crankshaft 12 rotates 30° C.A. Furthermore, for example, it may be determined whether there is a misfire based on the ratio of angular velocities when the crankshaft 12 rotates 30° C.A.

A small rotation angle for determining the rotation speed of the crankshaft 12 or a time required for the crankshaft 12 to rotate, to be used in the determination process, is not limited to 30° C.A and may be any rotation angle less than or equal to the interval at which the compression top dead center appears.

In the above-described embodiment, a process of determining whether a misfire has successively occurred in a specific cylinder is illustrated; however, a misfire determination process based on a torsion speed component ωr is not limited thereto.

Misfire Detection Apparatus

The misfire detection apparatus is not limited to the one that includes the CPU 62 and the ROM 64 and that executes software processing. The misfire detection apparatus may include, for example, a dedicated hardware circuit, such as an ASIC, that performs hardware processing on at least part of the one subjected to software processing in the above-described embodiment. In other words, the misfire detection apparatus may be configured as any one of the following (a) to (c). (a) The misfire detection apparatus includes a processing unit that executes all the processes in accordance with programs and a program storage device, such as a ROM, that stores the programs. (b) The misfire detection apparatus includes a processing unit and a program storage device that execute part of the processes in accordance with programs and a dedicated hardware circuit that executes the remaining processes. (c) The misfire detection apparatus includes a dedicated hardware circuit that executes all the processes. A plurality of the software processors each including a processing unit and a program storage device, or a plurality of the dedicated hardware circuits may be provided.

Vehicle

The vehicle is not limited to a series-parallel hybrid vehicle. The vehicle may be, for example, a series hybrid vehicle or a parallel hybrid vehicle. The vehicle is not limited to the one including an internal combustion engine and a motor generator as in-vehicle rotating machines. The vehicle may be, for example, the one including an internal combustion engine but not including a motor generator or may be, for example, the one including a motor generator but not including an internal combustion engine.

What is claimed is:

1. A misfire detection apparatus that is applied to an internal combustion engine of which a crankshaft is connected to a power transmission destination via a damper, the misfire detection apparatus comprising an electronic control unit configured to execute:
   a crank-side acquisition process of acquiring a crank-side speed that is a rotation speed of the crankshaft in a small rotation angle range at every predetermined rotation angle of the crankshaft;
   a downstream-side acquisition process of acquiring a downstream-side speed that is a rotation speed of a portion of the damper, opposite from the crankshaft, in a small rotation angle range at predetermined time intervals by communication from an external device outside the misfire detection apparatus;
   a calculation process of calculating a torsion speed component based on a physical model of which an input is a difference between the crank-side speed and the downstream-side speed, the torsion speed component being a component due to torsion of the damper in the crank-side speed;
   a determination process of determining whether there is a misfire in the internal combustion engine based on a determination speed variable that is a variable indicating a rotation speed of the crankshaft; from which the torsion speed component has been removed; and
   a phase compensation process of compensating a phase difference between the downstream-side speed and the crank-side speed that are used to calculate the difference that is the input of the physical model and varying a phase compensation amount for compensating the phase difference according to the rotation speed of the crankshaft, the phase compensation process including a process of reducing the phase compensation amount when the rotation speed of the crankshaft is high than when the rotation speed of the crankshaft is low, the phase compensation amount including an amount of delay in acquisition time of the downstream-side speed that is used to calculate the difference from acquisition time of the crank-side speed that is used to calculate the difference,
   wherein the phase compensation process further includes:
   a phase compensation amount calculation process of calculating the phase compensation amount such that a value of the phase compensation amount is smaller when the rotation speed of the crankshaft is high than when the rotation speed of the crankshaft is low; and
   an interpolation process of calculating the downstream-side speed that is used to calculate the difference by interpolation using the downstream-side speeds each acquired at time latest to a corresponding one of a pair of acquisition times in the crank-side acquisition process, the pair of acquisition times coming before and after time delayed by the phase compensation amount with respect to the acquisition time of the crank-side speed that is used to calculate the difference.

2. The misfire detection apparatus according to claim 1, wherein the phase compensation process is a process of, based on the phase compensation amount, correcting the downstream-side speed that is used to calculate the difference.

3. The misfire detection apparatus according to claim 1, wherein an acquisition time interval of the crank-side speed in the crank-side acquisition process is shorter than an acquisition time interval of the downstream-side speed in the downstream-side acquisition process.

4. The misfire detection apparatus according to claim 3, wherein the determination process based on the torsion speed component is executed on condition that the rotation speed of the crankshaft is lower than or equal to a predetermined speed.

* * * * *